No. 645,156. Patented Mar. 13, 1900.
W. J. WILLITS.
WHEEL FOR RAILWAY HAND CARS.
(Application filed May 27, 1899.)

(No Model.)

Witnesses:
Otis A. Earl
Caura M. Chappell

Inventor,
Warren J. Willits
By Fred L. Chappell
Att'y.

UNITED STATES PATENT OFFICE.

WARREN J. WILLITS, OF THREE RIVERS, MICHIGAN, ASSIGNOR TO THE SHEFFIELD CAR COMPANY, OF SAME PLACE.

WHEEL FOR RAILWAY HAND-CARS.

SPECIFICATION forming part of Letters Patent No. 645,156, dated March 13, 1900.

Application filed May 27, 1899. Serial No. 718,604. (No model.)

*To all whom it may concern:*

Be it known that I, WARREN J. WILLITS, a citizen of the United States, residing at the city of Three Rivers, in the county of St. Joseph and State of Michigan, have invented certain new and useful Improvements in Wheels for Railway Velocipedes or Hand-Cars, of which the following is a specification.

This invention relates to improvements in wheels for railway velocipedes or hand-cars.

The object of this invention is to provide a construction of wheel available for use on railway hand-cars or velocipedes in which a pneumatic tire can be effectively utilized and at the same time have the tire perfectly protected when used in connection with such velocipedes or hand-cars.

I accomplish the object of my invention by the devices and means described in this specification.

The invention is definitely pointed out and defined in the claims.

The invention is fully illustrated in the accompanying drawings, forming a part of this specification, in which—

Figure 1:
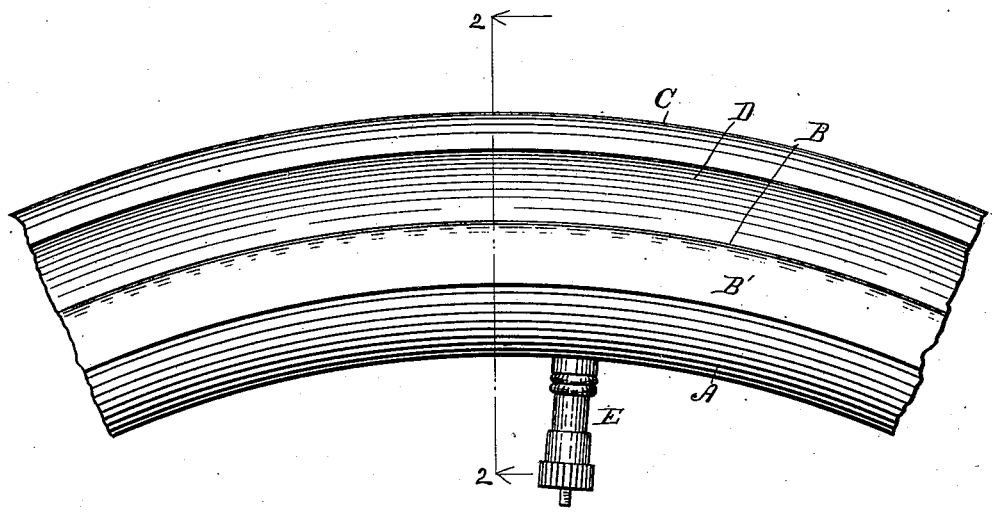
Figure 2:
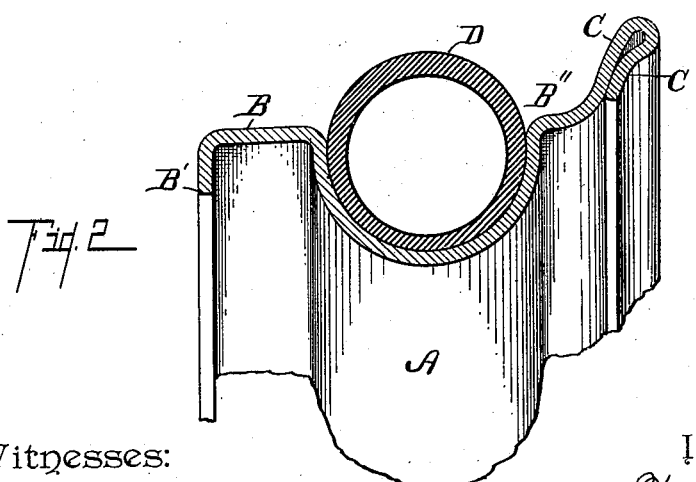

Figure 1 is an elevation view of a portion of a rim of a wheel made according to my invention, the view being taken from the left of Fig. 2. Fig. 2 is a sectional elevation taken on line 2 2 of Fig. 1 looking toward the left.

In the drawings similar letters of reference refer to similar parts throughout both views.

I have shown my improvement adapted to and in connection with a sheet-metal wheel-rim, which of course has its advantages in this particular relation, though the particular formation of the rim could be utilized in rims otherwise formed. I prefer, however, the sheet-metal rim and believe it possesses great merits over any other in this connection. When the rim is formed of sheet metal, I turn an upwardly-projecting flange at B' on the outer edge of the rim. I then form a narrow tread at B and then a simicircular groove at A for the reception of the pneumatic tire. The metal is then bent inwardly, forming another narrow tread at B'', in line with the outer tread B, and then downwardly and inwardly and is then looped on itself at C' to form the retaining-flange C, as distinctly appears in Fig. 2. This flange projects below the tire D.

The tire I make preferably round in cross-section, as that makes available the usual construction of pneumatic bicycle-tire, though I do not wish to be limited to the exact form of tire employed, as in this relation a tire of different cross-section might be utilized. The flange projecting beyond the tire serves as a support for the wheel when it is taken off from the rails, and thereby protects the tire from abrasion or puncture, and consequently prolongs the life of the same. At the same time all of the advantages of a pneumatic tire are gained.

When in use, the machine is ordinarily carried on the pneumatic tire. However, should the tire through any accident or otherwise be disinflated the machine is carried on the treads on either side of the pneumatic tire, and the treads also in case of obstructions or overloading the velocipede relieve the tire, and thus add greatly to the durability.

The usual valve E is provided for inflating the tire.

One of the narrow treads, either the inner or the outer, might be dispensed with, though I prefer the construction heretofore described having one on each side of the pneumatic tire.

I have shown no spokes or other support for the center of the wheel, as my invention does not pertain to the manner in which the rim is supported, but to the formation of the same in its relation to a pneumatic tire. The rim may be supported in any well-known way.

Having thus described my invention, what I claim as new, and desire to secure by Letters Patent, is—

1. In a wheel for use on railways, the combination of the rim formed of sheet metal having a flange B' on its outer side; a tread; a peripheral groove in said tread; a pneumatic tire on the outside of said rim resting in said groove and a retaining-flange projecting beyond the pneumatic tire to serve its purpose as a flange on a railway, and at the same time protect the tire when off the rails, for the purpose specified.

2. In a wheel for use on railways, the combination of a wheel with a tread, containing a peripheral groove; a pneumatic tire on the outside of said rim resting in said groove and a flange on the wheel projecting beyond the tire to serve its purpose for retaining the wheel on the track and to protect the tire when off the rails, as specified.

In witness whereof I have hereunto set my hand and seal in the presence of two witnesses.

WARREN J. WILLITS. [L. S.]

Witnesses:
E. A. HENDERSON,
W. A. MOWRER.